US012660024B2

(12) United States Patent
Padebettu

(10) Patent No.:     US 12,660,024 B2
(45) Date of Patent:          Jun. 16, 2026

(54) SUPPORTING A PREMISES RADIO ACCESS STATION INTEGRATED WITH A WIRELINE RESIDENTIAL GATEWAY

(71) Applicant: Juniper Networks, Inc., Sunnyvale, CA (US)

(72) Inventor: Venkatesh Padebettu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 230 days.

(21) Appl. No.: 18/331,424

(22) Filed: Jun. 8, 2023

(65)              Prior Publication Data

US 2024/0414790 A1      Dec. 12, 2024

(51) Int. Cl.
     *H04W 12/06*          (2021.01)
     *H04W 12/08*          (2021.01)
     *H04W 76/15*          (2018.01)
(52) U.S. Cl.
     CPC ...........  *H04W 76/15* (2018.02); *H04W 12/06* (2013.01); *H04W 12/08* (2013.01)
(58) Field of Classification Search
     CPC ..... H04W 12/06; H04W 12/08; H04W 76/15; H04W 84/045
     USPC ........................................................ 370/329
     See application file for complete search history.

(56)              References Cited

U.S. PATENT DOCUMENTS

| | | | |
|---|---|---|---|
| 2014/0003322 A1 | 1/2014 | Grinshpun et al. | |
| 2021/0297402 A1 | 9/2021 | Wong et al. | |
| 2022/0141176 A1* | 5/2022 | Padebettu ............. | H04L 61/103 370/389 |
| 2023/0146807 A1* | 5/2023 | Padebettu ........... | H04L 12/4633 370/389 |

FOREIGN PATENT DOCUMENTS

| | | |
|---|---|---|
| CN | 102036327 B | 6/2013 |
| WO | 2022192638 A1 | 9/2022 |

OTHER PUBLICATIONS

3rd Generation Partnership Project;Technical Specification Group Services and System Aspects;Study of enhancements for residential 5G;Stage 1(Release 18); 3GPP TR 22.858 V18.2.0 (Dec. 2021) ;55 pages.
Extended European Search Report for Application No. EP23190870. 8, mailed on Mar. 18, 2024, 7 pages.

* cited by examiner

*Primary Examiner* — Robert J Lopata
(74) *Attorney, Agent, or Firm* — Harrity & Harrity, LLP

(57)              ABSTRACT

A device may utilize a network address to cross-connect a session for a user equipment from a premises radio access station integrated with a network device, and may authenticate the user equipment based on the session. The device may authorize the user equipment for the session, and may provide, via the session and the premises radio access station integrated with the network device, one or more services to the user equipment as an independent subscriber.

20 Claims, 8 Drawing Sheets

100

105

Utilize a network address to cross-
connect sessions from the PRAS to
the AGF

100

130
Establish a call or a connection for the UE via the RAN

135
Switch call or connection to PRAS

140
Receive the call or the connection and reestablish the call or the connection for the UE

145
Call or connection

Core network

UE

RAN

PRAS

Network device

AGF

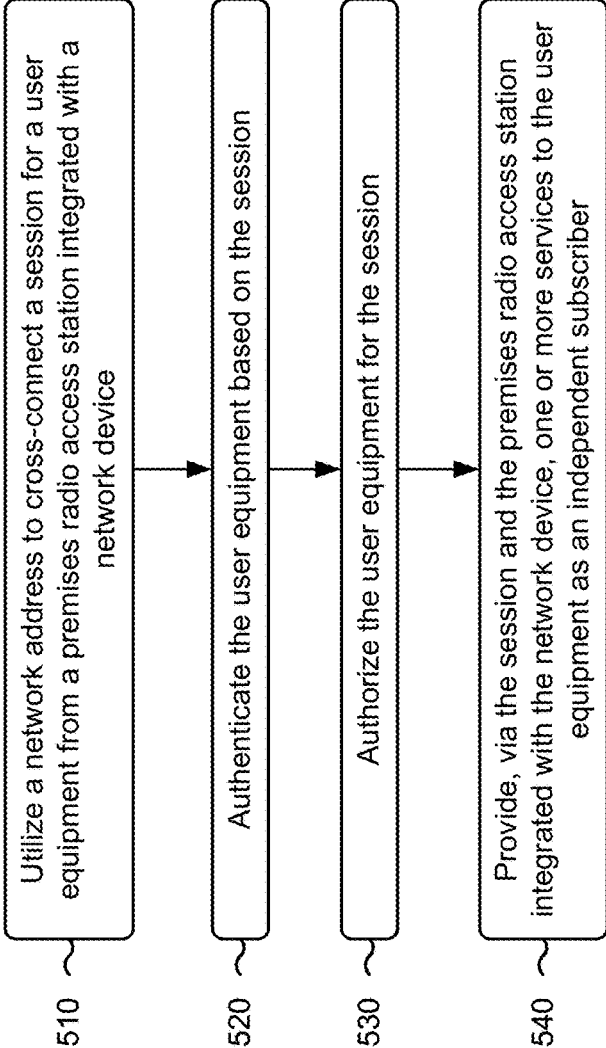

510 — Utilize a network address to cross-connect a session for a user equipment from a premises radio access station integrated with a network device 520 — Authenticate the user equipment based on the session 530 — Authorize the user equipment for the session 540 — Provide, via the session and the premises radio access station integrated with the network device, one or more services to the user equipment as an independent subscriber

SUPPORTING A PREMISES RADIO ACCESS STATION INTEGRATED WITH A WIRELINE RESIDENTIAL GATEWAY

BACKGROUND

A premises radio access station (PRAS) is a small indoor base station that externally connects to a network device, such as a fixed network residential gateway, and that supports wireless communication for a user equipment (UE) (e.g., located indoors).

SUMMARY

Some implementations described herein relate to a method. The method may include utilizing a network address to cross-connect a session for a UE from a PRAS integrated with a network device, and authenticating the UE based on the session. The method may include authorizing the UE for the session, and providing, via the session and the PRAS integrated with the network device, one or more services to the UE as an independent subscriber.

Some implementations described herein relate to a device that may include one or more memories and one or more processors. The one or more processors may be configured to utilize a network address to cross-connect a session for a UE from a PRAS integrated with a network device, wherein the PRAS is integrated with the network device via hardware or a hardware connection. The one or more processors may be configured to authenticate the UE based on the session, and authorize the UE for the session. The one or more processors may be configured to provide, via the session and the PRAS integrated with the network device, one or more services to the UE as an independent subscriber.

Some implementations described herein relate to a non-transitory computer-readable medium that stores a set of instructions. The set of instructions, when executed by one or more processors of a device, may cause the device to utilize a network address to cross-connect a session for a UE from a PRAS integrated with a residential gateway, and authenticate the UE based on the session. The set of instructions, when executed by one or more processors of the device, may cause the device to authorize the UE for the session, and provide, via the session and the PRAS integrated with the residential gateway, one or more services to the UE as an independent subscriber.

BRIEF DESCRIPTION OF THE DRAWINGS

FIG. 5 is a flowchart of an example process for supporting a PRAS integrated with a wireline residential gateway.

DETAILED DESCRIPTION

Figure 1A:
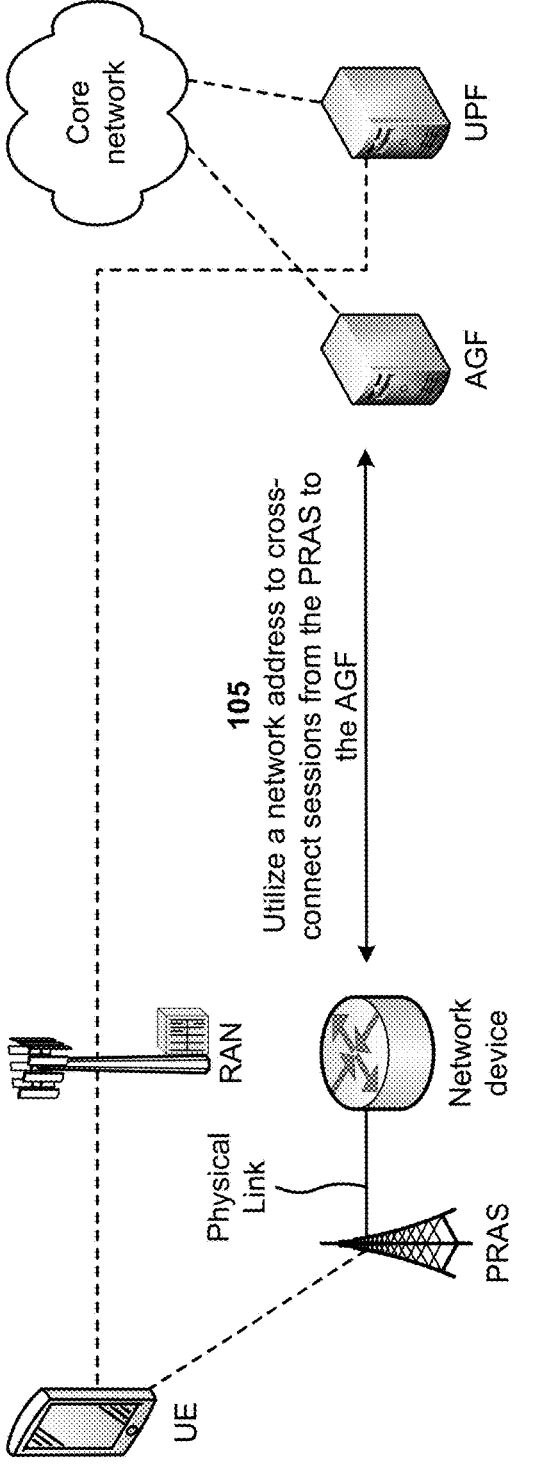
FIGS. 1A-1D are diagrams of an example associated with supporting a PRAS integrated with a wireline residential gateway.

The following detailed description of example implementations refers to the accompanying drawings. The same reference numbers in different drawings may identify the same or similar elements.

Currently, a PRAS externally connects to a fixed network residential gateway, which causes the PRAS to be behind the residential gateway. Since the PRAS is behind the residential gateway, many restrictions are imposed on the PRAS due to network address translation (NAT), which is deployed on customer premises equipment (CPE). For example, a short message service (SMS) or text message triggered from a fifth generation (5G) core network, when the PRAS is idle, is unable to traverse the residential gateway because of NAT. Furthermore, NAT creates other complexities (e.g., bandwidth sharing, double billing, and/or the like) for the current configuration of the PRAS and the residential gateway since NAT only works for signaling received by the PRAS from a UE.

Thus, the current configuration of the PRAS and the residential gateway consume computing resources (e.g., processing resources, memory resources, communication resources, and/or the like), networking resources, and/or other resources associated with failing to provide services from a core network to a UE communicating with the PRAS, providing a poor user experience for the UE attempting to access the services from the core network, handling lost traffic for the UE attempting to access the services from the core network, attempting to recover the lost traffic, and/or the like.

Some implementations described herein provide a device (e.g., an AGF) that supports a PRAS integrated with a wireline residential gateway. For example, the AGF may utilize a network address to cross-connect a session for a UE from a PRAS integrated with a residential gateway, and may authenticate the UE based on the session. The AGF may authorize the UE for the session, and may provide, via the session and the PRAS integrated with the residential gateway, one or more services to the UE as an independent subscriber. The AGF may receive, from the PRAS integrated with the residential gateway, a request to reestablish a call or a connection of the UE that switched to the PRAS integrated with the residential gateway, and may reestablish the call or the connection based on the request. The AGF may receive a wake-up service for the UE from a core network, and may provide the wake-up service to the PRAS integrated with the residential gateway. The PRAS integrated with the residential gateway may provide the wake-up service to the UE.

In this way, the AGF supports a PRAS integrated with a wireline residential gateway. For example, the AGF may communicate with a PRAS that is physically integrated with a residential gateway. The PRAS may utilize a network address (e.g., a wide area network (WAN) Internet protocol (IP) address) to cross-connect UE sessions from the PRAS to the AGF. The AGF may operate in a direct mode (e.g., that supports a core network) to authenticate, authorize, and provide services to a UE connected to the PRAS as an independent subscriber. Thus, the AGF may conserve computing resources, networking resources, and/or other resources that would otherwise have been consumed by failing to provide services from a core network to a UE communicating with the PRAS, providing a poor user experience for the UE attempting to access the services from the core network, handling lost traffic for the UE attempting to access the services from the core network, attempting to recover the lost traffic, and/or the like.

FIGS. 1A-1D are diagrams of an example 100 associated with supporting a PRAS integrated with a wireline residential gateway. As shown in FIGS. 1A-1D, example 100 includes a UE, a radio access network (RAN), a PRAS, a network device, and a core network with an AGF and a user plane function (UPF). Further details of the UE, the RAN, the PRAS, the network device, the core network, the AGF, and the UPF are provided elsewhere herein. Although only one UE is depicted in FIG. 1A, in some implementations more than one UE 205 may be associated with the RAN, the PRAS, the network device, the core network, the AGF, and the UPF. Furthermore, although implementations described herein relate to an AGF, in some implementations, the AGF may be replaced with a broadband network gateway (BNG).

As shown in FIG. 1A, the PRAS may connect to the network device (e.g., a residential gateway) via a physical link. In some implementations, the PRAS may be physically integrated with the network device via hardware or via a wired (e.g., universal serial bus (USB)) connection. In this way, the PRAS will not be connected externally behind the network device and will not be subject to the restrictions caused by NAT. As further shown in FIG. 1A, the UE may connect to the core network via the RAN and the UPF. Alternatively, or additionally, if the UE is located indoors (e.g., near the PRAS and the network device), the UE may connect to the core network via the PRAS, the network device, and the AGF.

As further shown in FIG. 1A, and by reference number 105, the AGF may utilize a network address to cross-connect sessions (e.g., for the UE) from the PRAS to the AGF. For example, the PRAS and the AGF may utilize the network address to cross-connect sessions (e.g., for the UE) from the PRAS and the network device to the AGF. In some implementations, the network address may include a WAN IP address associated with the PRAS.

Figure 1B:
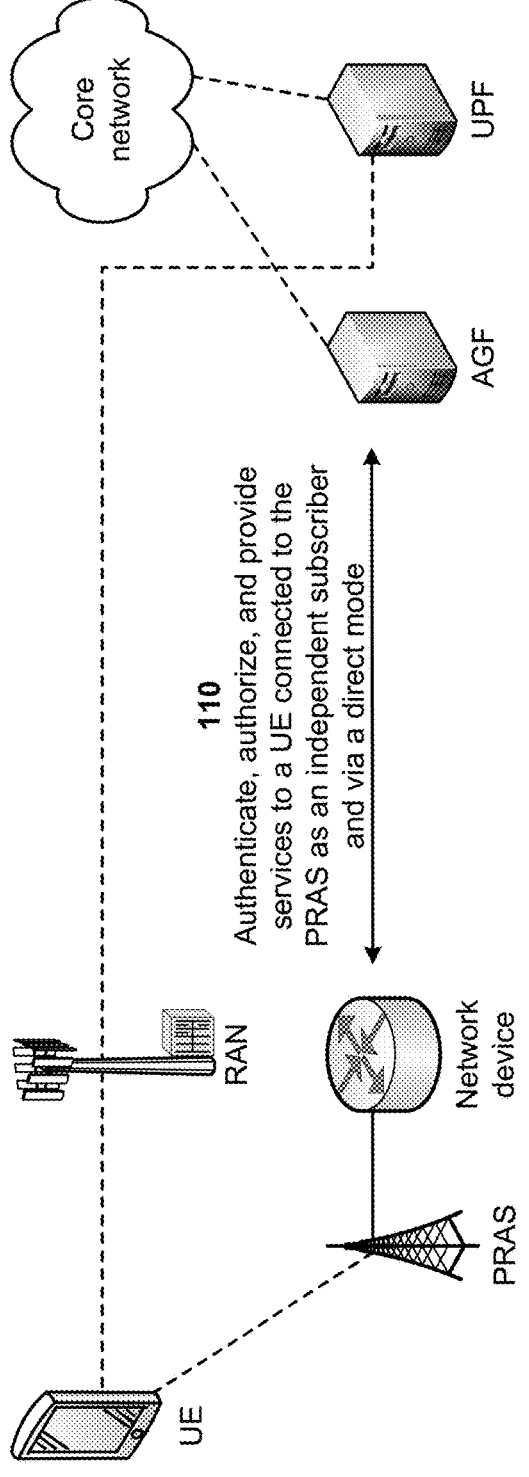

As shown in FIG. 1B, and by reference number 110, the AGF may authenticate, authorize, and provide services to the UE connected to the PRAS as an independent subscriber and via a direct mode. For example, the UE may provide a request for a session to the PRAS integrated with the network device, and the PRAS integrated with the network device may provide the request to the AGF. The AGF may receive the request for the session, and may authenticate the UE based on the session. In some implementations, the AGF may authenticate the UE by determining whether the UE is entitled to utilize the session (e.g., provided by the core network). If the AGF determines that the UE is entitled to utilize the session, the AGF may authenticate the UE. Alternatively, if the AGF determines that the UE is not entitled to utilize the session, the AGF may not authenticate the UE.

When the AGF authenticates the UE, the AGF may determine whether the UE is authorized for the session based on an account associated with the UE, a type of UE, and/or the like. In some implementations, if the AGF determines that the UE is authorized for the session, the AGF may authorize the UE for the session. Alternatively, if the AGF determines that the UE is not authorized for the session, the AGF may not authorize the UE for the session. When the AGF authorizes the UE for the session, the AGF may provide the one or more services to the UE and via the session. In some implementations, the AGF may provide the one or more services to the PRAS integrated with the network device, and the PRAS integrated with the network device may provide the one or more services to the UE as an independent subscriber.

Figure 1C:
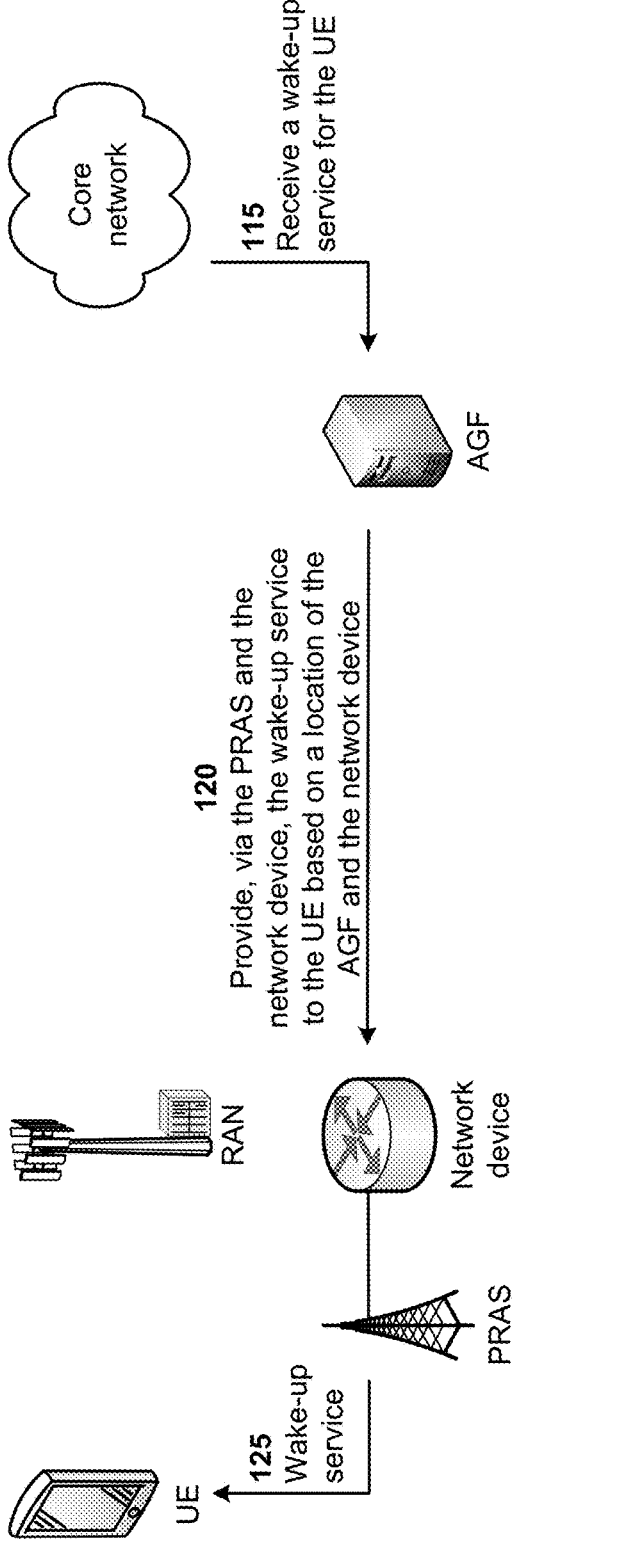

As shown in FIG. 1C, and by reference number 115, the AGF may receive a wake-up service for the UE from the core network. For example, the AGF and/or the network device may be associated with physical location information that may be utilized by the core network to provide services to the UE (e.g., since the location information may indicate a location of the UE). In some implementations, the core network may utilize the location information to provide one or more wake-up services to the UE. The wake-up services may include a short message service (SMS), an emergency service, a service provided by the core network to the UE via the PRAS integrated with the network device, and/or the like. The core network may provide the wake-up service to the AGF, and the AGF may receive the wake-up service from the core network based on the location information associated with the AGF and/or the network device.

As further shown in FIG. 1C, and by reference number 120, the AGF may provide, via the PRAS and the network device, the wake-up service to the UE based on a location of the AGF and the network device. For example, after receiving the wake-up service based on the location information, the AGF may provide the wake-up service to the PRAS integrated with the network device. The PRAS integrated with the network device may receive the wake-up service from the AGF.

As further shown in FIG. 1C, and by reference number 125, the PRAS and the network device may provide the wake-up service to the UE. For example, after receiving the wake-up service, the PRAS integrated with the network device may provide the wake-up service to the UE. The UE may receive the wake-up service and may display the wake-up service to a user of the UE.

Figure 1D:
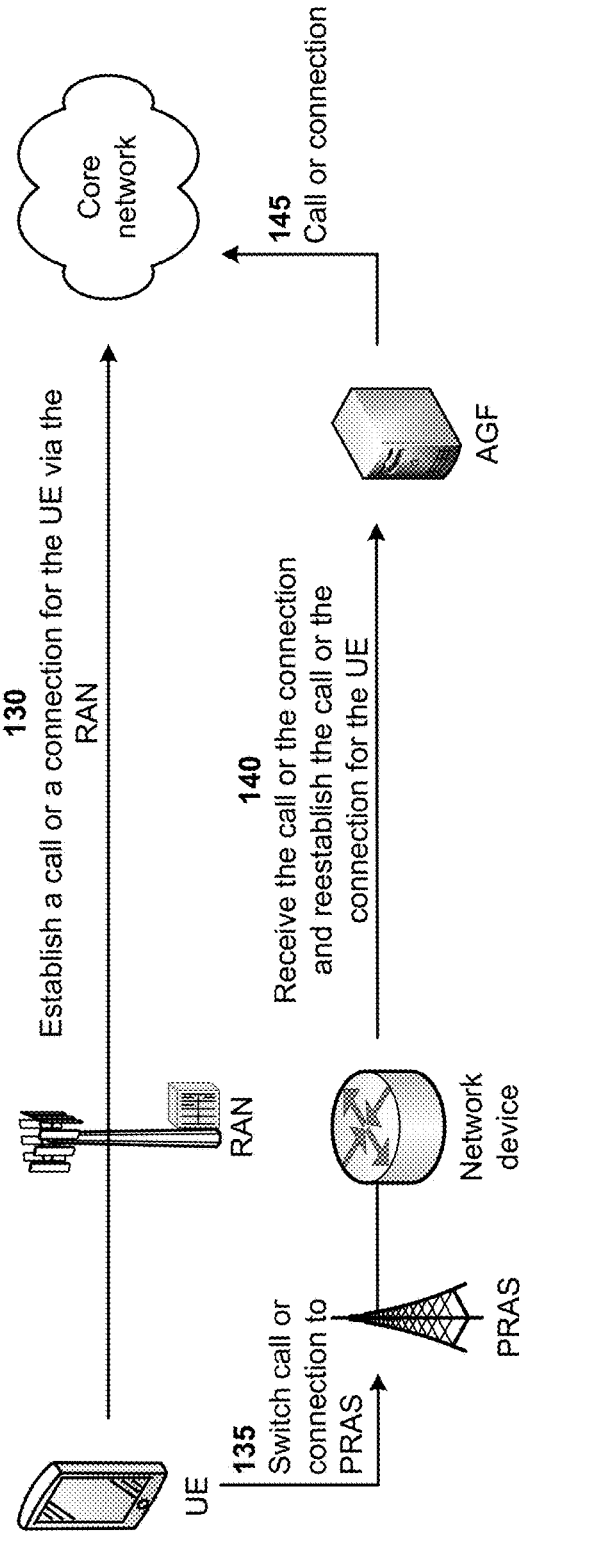

As shown in FIG. 1D, and by reference number 130, the UE may establish a call or a connection with the core network, via the RAN. For example, when the UE is located away from the premises (e.g., when a signal strength of the RAN is stronger than a signal strength of the PRAS), the UE may establish a call or a connection (e.g., for receiving a service) with the core network via the RAN.

As further shown in FIG. 1D, and by reference number 135, the UE may switch the call or the connection to the PRAS. For example, when the UE is located near or within the premises (e.g., when a signal strength of the PRAS is stronger than a signal strength of the RAN), the UE may switch the call or the connection to the PRAS integrated with the network device. In some implementations, the PRAS integrated with the network device may receive a request to handle the call or the connection from the UE when the UE is located near or within the premises.

As further shown in FIG. 1D, and by reference number 140, the AGF may receive the call or the connection and may reestablish the call or the connection for the UE. For example, the PRAS integrated with the network device may provide the request to handle the call or the connection to the AGF, and the AGF may receive the request to handle the call or the connection from the PRAS integrated with the network device. Based on the request to handle the call or the connection, the AGF may attempt to reestablish the call or the connection (e.g., for the UE) with the core network. In some implementations, the attempt to reestablish the call or the connection (e.g., for the UE) with the core network may be successful. Alternatively, the attempt to reestablish the call or the connection (e.g., for the UE) with the core network may be unsuccessful and the call or the connection may be dropped.

As further shown in FIG. 1D, and by reference number 145, the AGF may establish the call or the connection with the core network. For example, when the attempt to reestablish the call or the connection (e.g., for the UE) with the core network is successful, the AGF may establish the call or the connection (e.g., for the UE) with the core network. The UE may then continue the call or the connection with the core network.

In this way, the AGF supports a PRAS integrated with a wireline residential gateway. For example, the AGF may communicate with a PRAS that is physically integrated with a residential gateway. The PRAS may utilize a network address to cross-connect UE sessions from the PRAS to the AGF. The AGF may operate in a direct mode to authenticate, authorize, and provide services to a UE connected to the PRAS as an independent subscriber. Thus, the AGF may conserve computing resources, networking resources, and/or other resources that would otherwise have been consumed by failing to provide services from a core network to a UE communicating with the PRAS, providing a poor user experience for the UE attempting to access the services from the core network, handling lost traffic for the UE attempting to access the services from the core network, attempting to recover the lost traffic, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
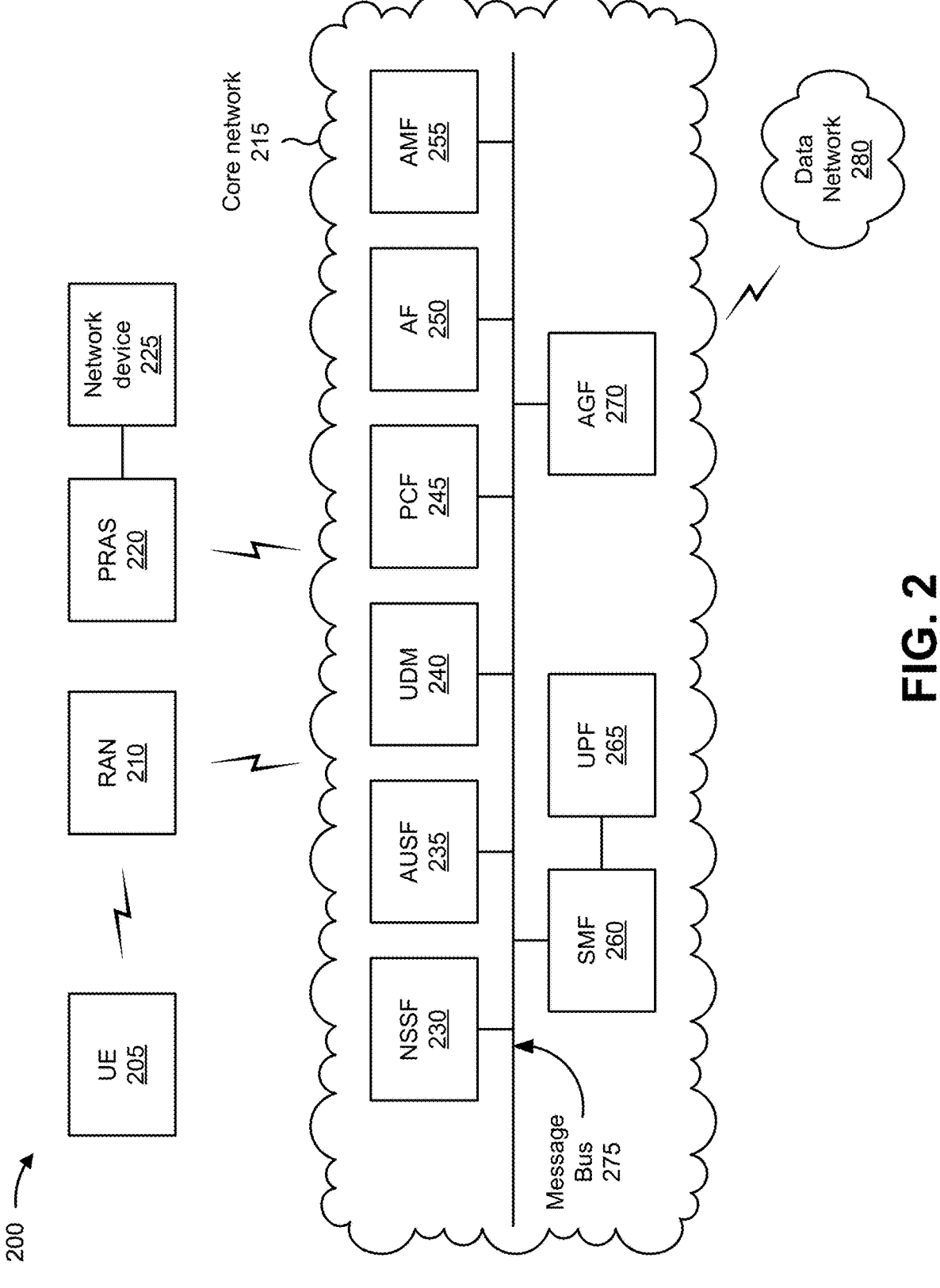
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include a UE 205, a RAN 210, a core network 215, a PRAS 220, a network device 225, and a data network 280. Devices and/or networks of the example environment 200 may interconnect via wired connections, wireless connections, or a combination of wired and wireless connections.

The UE 205 may include one or more devices capable of receiving, generating, storing, processing, and/or providing information, as described elsewhere herein. The UE 205 may include a communication device and/or a computing device. For example, the UE 205 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The RAN 210 may support, for example, a cellular radio access technology (RAT). The RAN 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 205. The RAN 210 may transfer traffic between the UE 205 (e.g., using a cellular RAT), one or more base stations (e.g., using a wireless interface or a backhaul interface, such as a wired backhaul interface), and/or the core network 215. The RAN 210 may provide one or more cells that cover geographic areas.

In some implementations, the RAN 210 may perform scheduling and/or resource management for the UE 205 covered by the RAN 210 (e.g., the UE 205 covered by a cell provided by the RAN 210). In some implementations, the RAN 210 may be controlled or coordinated by a network controller, which may perform load balancing, network-level configuration, and/or other operations. The network controller may communicate with the RAN 210 via a wireless or wireline backhaul. In some implementations, the RAN 210 may include a network controller, a self-organizing network (SON) module or component, or a similar module or component. In other words, the RAN 210 may perform network control, scheduling, and/or network management functions (e.g., for uplink, downlink, and/or sidelink communications of the UE 205 covered by the RAN 210).

The PRAS 220 may support, for example, a cellular RAT, and may include a base station (e.g., a base transceiver station, a radio base station, an access point, a transmit receive point (TRP), a microcell base station, a picocell base station, a femtocell base station, or a similar type of device) that can support wireless communication for the UE 205. In some implementations, the PRAS 220 may include an indoor base station that connects the UE 205 over a New Radio wireless air interface. In some implementations, the PRAS 220 is physically integrated with the network device 225 via hardware or via a wired (e.g., universal serial bus (USB)) connection.

The network device 225 may include one or more devices capable of receiving, processing, storing, routing, and/or providing traffic (e.g., a packet and/or other information or metadata) in a manner described herein. For example, the network device 225 may include a router, such as a label switching router (LSR), a label edge router (LER), an ingress router, an egress router, a provider router (e.g., a provider edge router or a provider core router), a virtual router, or another type of router. Additionally, or alternatively, the network device 225 may include a gateway, a switch, a firewall, a hub, a bridge, a reverse proxy, a server (e.g., a proxy server, a cloud server, or a data center server), a load balancer, and/or a similar device. In some implementations, the network device 225 may be a physical device implemented within a housing, such as a chassis. In some implementations, the network device 225 may be a virtual device implemented by one or more computing devices of a cloud computing environment or a data center. In some implementations, a group of network devices 225 may be a group of data center nodes that are used to route traffic flow through a network. In some implementations, the network device 225 may include a residential gateway that provides, for example, voice, data, broadcast video, video on demand, and/or the like to other devices in a customer premises. In some implementations, the network device 225 may include a 5G residential gateway capable of connecting to the core network 215 via fixed broadband access, cable access, and/or the like.

In some implementations, the core network 215 may include an example functional architecture in which systems and/or methods described herein may be implemented. For example, the core network 215 may include an example architecture of a 5G next generation (NG) core network included in a 5G wireless telecommunications system. While the example architecture of the core network 215 shown in FIG. 2 may be an example of a service-based architecture, in some implementations, the core network 215 may be implemented as a reference-point architecture and/or a 4G core network, among other examples.

As shown in FIG. 2, the core network 215 may include a number of functional elements. The functional elements may include, for example, a network slice selection function (NSSF) 230, an authentication server function (AUSF) 235, a unified data management (UDM) component 240, a policy control function (PCF) 245, an application function (AF) 250, an access and mobility management function (AMF) 255, a session management function (SMF) 260, a UPF 265, and/or an AGF 270. These functional elements may be communicatively connected via a message bus 275. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 230 includes one or more devices that select network slice instances for the UE 205. By providing network slicing, the NSSF 230 allows an operator to deploy multiple substantially independent end-to-end networks potentially with the same infrastructure. In some implementations, each slice may be customized for different services.

The AUSF 235 includes one or more devices that act as an authentication server and support the process of authenticating the UE 205 in the wireless telecommunications system.

The UDM 240 includes one or more devices that store user data and profiles in the wireless telecommunications system. The UDM 240 may be used for fixed access and/or mobile access in the core network 215.

The PCF 245 includes one or more devices that provide a policy framework that incorporates network slicing, roaming, packet processing, and/or mobility management, among other examples.

The AF 250 includes one or more devices that support application influence on traffic routing, access to a network exposure function, and/or policy control, among other examples.

The AMF 255 includes one or more devices that act as a termination point for non-access stratum (NAS) signaling and/or mobility management, among other examples.

The SMF 260 includes one or more devices that support the establishment, modification, and release of communication sessions in the wireless telecommunications system. For example, the SMF 260 may configure traffic steering policies at the UPF 265 and/or may enforce user equipment Internet protocol (IP) address allocation and policies, among other examples.

The UPF 265 includes one or more devices that serve as an anchor point for intraRAT and/or interRAT mobility. The UPF 265 may apply rules to packets, such as rules pertaining to packet routing, traffic reporting, and/or handling user plane QoS, among other examples.

The AGF 270 includes one or more devices that provide authentication, authorization and accounting (AAA) services and hierarchical traffic shaping and policing for fixed network and 5G residential gateways (e.g., the network device 225) being served from the UPF 265.

The message bus 275 represents a communication structure for communication among the functional elements. In other words, the message bus 275 may permit communication between two or more functional elements.

The data network 280 includes one or more wired and/or wireless data networks. For example, the data network 280 may include an Internet protocol multimedia subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
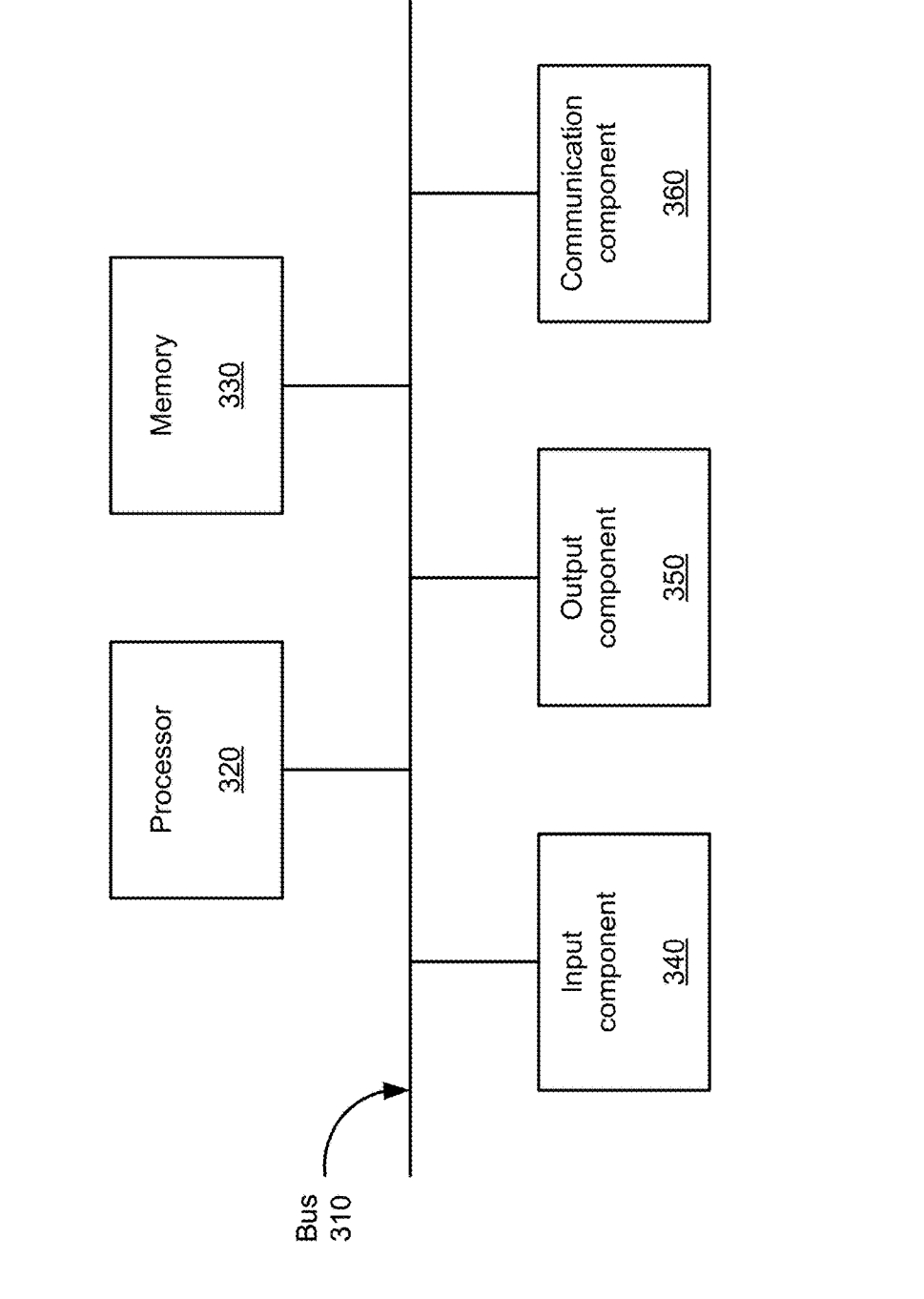
FIGS. 3 and 4 are diagrams of example components of one or more devices of FIG. 2.

FIG. 3 is a diagram of example components of a device 300, which may correspond to the UE 205, the RAN 210, the PRAS 220, the network device 225, the NSSF 230, the AUSF 235, the UDM 240, the PCF 245, the AF 250, the AMF 255, the SMF 260, the UPF 265, and/or the AGF 270. In some implementations, the UE 205, the RAN 210, the PRAS 220, the network device 225, the NSSF 230, the AUSF 235, the UDM 240, the PCF 245, the AF 250, the AMF 255, the SMF 260, the UPF 265, and/or the AGF 270 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
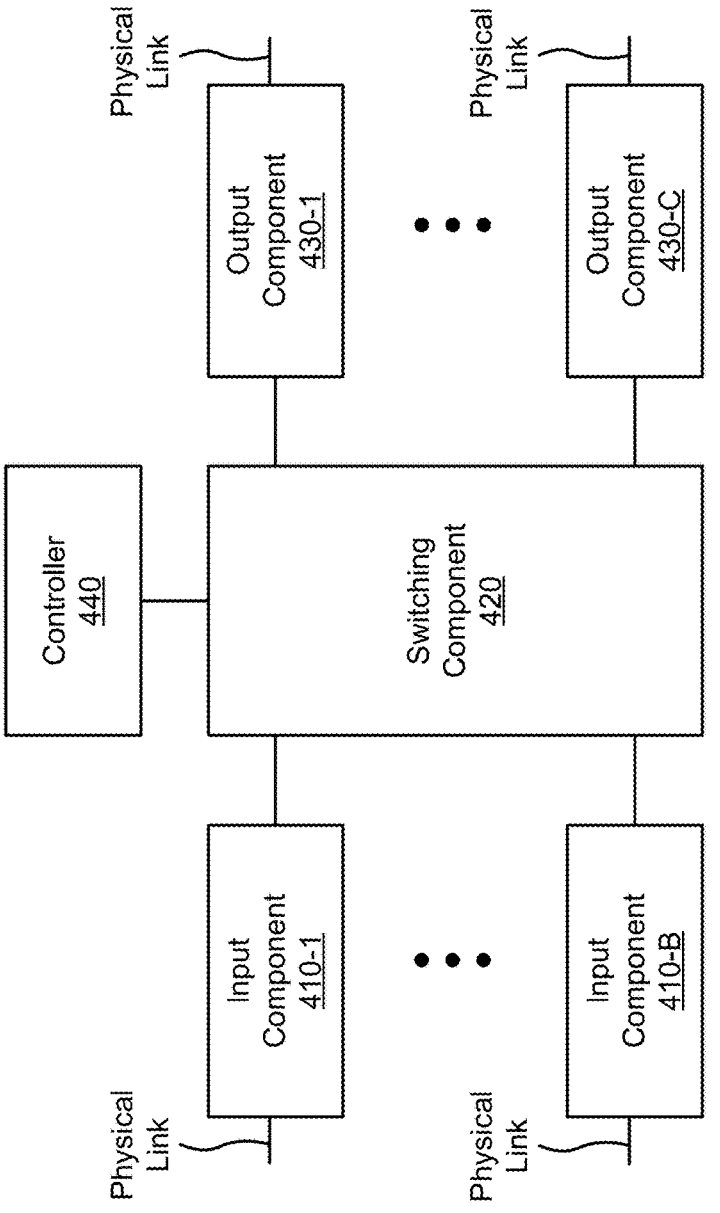

FIG. 4 is a diagram of example components of a device 400, which may correspond to the network device 225. In some implementations, the network device 225 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or the output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for supporting a PRAS integrated with a wireline residential gateway. In some implementations, one or more process blocks of FIG. 5 may be performed by a device (e.g., the AGF 270). In some implementations, one or more process blocks of FIG. 5 may be performed by another device or a group of devices separate from or including the device, such as a PRAS (e.g., the PRAS 220), a network device (e.g., the network device 225), and/or the like. Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include utilizing a network address to cross-connect a session for a user equipment from a premises radio access station integrated with a network device (block 510). For example, the device may utilize a network address to cross-connect a session for a user equipment from a premises radio access station integrated with a network device, as described above. In some implementations, the network device is a residential gateway. In some implementations, the premises radio access station is integrated with the network device via hardware or a hardware connection. In some implementations, the device is an access gateway function of a core network. In some implementations, the network address is a wide area network Internet protocol address.

As further shown in FIG. 5, process 500 may include authenticating the user equipment based on the session (block 520). For example, the device may authenticate the user equipment based on the session, as described above.

As further shown in FIG. 5, process 500 may include authorizing the user equipment for the session (block 530). For example, the device may authorize the user equipment for the session, as described above.

As further shown in FIG. 5, process 500 may include providing, via the session and the premises radio access station integrated with the network device, one or more services to the user equipment as an independent subscriber (block 540). For example, the device may provide, via the session and the premises radio access station integrated with the network device, one or more services to the user equipment as an independent subscriber, as described above. In some implementations, providing the one or more services to the user equipment as the independent subscriber includes providing the one or more services to the user equipment via a direct mode supported for a core network. In some implementations, providing the one or more services to the user equipment includes providing the one or more services to the user equipment without utilizing network address translation.

In some implementations, process 500 includes receiving, from the premises radio access station integrated with the network device, a request to reestablish a call of the user equipment that switched to the premises radio access station integrated with the network device, and reestablishing the call based on the request. In some implementations, process 500 includes receiving, from the premises radio access station integrated with the network device, a request to reestablish a connection of the user equipment that switched to the premises radio access station integrated with the network device, and reestablishing the connection with a core network based on the request.

In some implementations, process 500 includes receiving a wake-up service for the user equipment from a core network, and providing the wake-up service to the premises radio access station integrated with the network device, wherein the wake-up service is provided to the user equipment by the premises radio access station integrated with the network device. In some implementations, providing the wake-up service to the premises radio access station integrated with the network device includes providing the wake-up service to the premises radio access station integrated with the network device based on a location of the device and a location of the network device. In some implementations, the wake-up service is one of a short message service or an emergency service. In some implementations, providing the wake-up service to the premises radio access station integrated with the network device includes providing the wake-up service to the premises radio access station integrated with the network device without utilizing network address translation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
utilizing, by a device, a network address to cross-connect a session for a user equipment from a premises radio access station integrated with a network device;
providing, by the device and via the session and the premises radio access station integrated with the network device, one or more services to the user equipment as an independent subscriber;
receiving, by the device and from the premises radio access station integrated with the network device, a request to reestablish a call or a connection of the user equipment that switched to the premises radio access station integrated with the network device; and
reestablishing, by the device, the call or the connection based on the request.

2. The method of claim 1,
wherein the network device is a residential gateway.

3. The method of claim 1,
wherein the premises radio access station is integrated with the network device via hardware or a hardware connection.

4. The method of claim 1,
wherein providing the one or more services to the user equipment as the independent subscriber comprises:
providing the one or more services to the user equipment via a direct mode supported for a core network.

5. The method of claim 1,
wherein the device is an access gateway function of a core network.

6. A device, comprising:
one or more memories; and
one or more processors to:
utilize a network address to cross-connect a session for a user equipment from a premises radio access station integrated with a network device,
wherein the premises radio access station is integrated with the network device via hardware or a hardware connection;
provide, via the session and the premises radio access station integrated with the network device, one or more services to the user equipment as an independent subscriber;
receive a wake-up service for the user equipment from a core network; and
provide the wake-up service to the premises radio access station integrated with the network device,
wherein the wake-up service is provided to the user equipment by the premises radio access station integrated with the network device.

7. The device of claim 6,
wherein the network address is a wide area network Internet protocol address.

8. The device of claim 6,
wherein the one or more processors, to provide the one or more services to the user equipment, are configured to:
provide the one or more services to the user equipment without utilizing network address translation.

9. The device of claim 6,
wherein the one or more processors, to provide the wake-up service to the premises radio access station integrated with the network device, are configured to:
provide the wake-up service to the premises radio access station integrated with the network device based on a location of the device and a location of the network device.

10. The device of claim 6,
wherein the wake-up service is one of a short message service or an emergency service.

11. The device of claim 6,
wherein the one or more processors, to provide the wake-up service to the premises radio access station integrated with the network device, are configured to:
provide the wake-up service to the premises radio access station integrated with the network device without utilizing network address translation.

12. A non-transitory computer-readable medium storing a set of instructions, the set of instructions comprising:
one or more instructions that, when executed by one or more processors of a device, cause the device to:
utilize a network address to cross-connect a session for a user equipment from a premises radio access station integrated with a residential gateway;

provide, via the session and the premises radio access station integrated with the residential gateway, one or more services to the user equipment as an independent subscriber;

receive a wake-up service for the user equipment from a core network; and provide the wake-up service to the premises radio access station integrated with the residential gateway, wherein the wake-up service is provided to the user equipment by the premises radio access station integrated with the residential gateway.

13. The non-transitory computer-readable medium of claim 12, wherein the one or more instructions, that cause the device to provide the one or more services to the user equipment as the independent subscriber, cause the device to:

provide the one or more services to the user equipment via a direct mode supported for the core network.

14. The non-transitory computer-readable medium of claim 12, wherein the one or more instructions further cause the device to:

receive, from the premises radio access station integrated with the residential gateway, a request to reestablish a call of the user equipment that switched to the premises radio access station integrated with the residential gateway; and reestablish the call based on the request.

15. The non-transitory computer-readable medium of claim 12, wherein the one or more instructions further cause the device to:

receive, from the premises radio access station integrated with the residential gateway, a request to reestablish a connection of the user equipment that switched to the premises radio access station integrated with the residential gateway; and reestablish the connection with the core network based on the request.

16. The non-transitory computer-readable medium of claim 12, wherein the one or more instructions, that cause the device to provide the one or more services to the user equipment, cause the device to:

provide the one or more services to the user equipment without utilizing network address translation.

17. The method of claim 1, further comprising:

receiving a wake-up service for the user equipment from a core network; and providing the wake-up service to the premises radio access station integrated with the network device, wherein the wake-up service is provided to the user equipment by the premises radio access station integrated with the network device.

18. The method of claim 1, wherein providing the one or more services to the user equipment comprises:

providing the one or more services to the user equipment without utilizing network address translation.

19. The device of claim 6 herein the one or more processors, to provide the one or more services to the user equipment as the independent subscriber, are configured to:

provide the one or more services to the user equipment via a direct mode supported for the core network.

20. The non-transitory computer-readable medium of claim 12, wherein the one or more instructions, that cause the device to provide the one or more services to the user equipment, cause the device to:

provide the one or more services to the user equipment via a direct mode supported for the core network.

* * * * *